US012769154B1

(12) United States Patent
Yu et al.

(10) Patent No.: US 12,769,154 B1
(45) Date of Patent: Oct. 20, 2026

(54) ELECTRO-OPTIC MODULATOR INTEGRATING MICRO-CAPACITOR

(71) Applicant: SILITH TECHNOLOGY PTE. LTD., Singapore (SG)

(72) Inventors: Yunchu Yu, Singapore (SG); Ke Zhang, Singapore (SG)

(73) Assignee: SILITH TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 19/641,431

(22) Filed: Apr. 7, 2026

(51) Int. Cl.
*G02F 1/01* (2006.01)
*G02F 1/015* (2006.01)
*G02F 1/21* (2006.01)

(52) U.S. Cl.
CPC .......... *G02F 1/0121* (2013.01); *G02F 1/0154* (2021.01); *G02F 1/212* (2021.01)

(58) Field of Classification Search
CPC ...... G02F 1/0121; G02F 1/025; G02F 1/2255; G02F 1/2257
See application file for complete search history.

(56) References Cited

U.S. PATENT DOCUMENTS 9,841,618 B1 * 12/2017 Poulin .................. G02F 1/2255

* cited by examiner

*Primary Examiner* — Michael P Mooney
(74) *Attorney, Agent, or Firm* — JCIPRNET

(57) ABSTRACT

Relates to field of optical communication, provides electro-optic modulator integrating a plurality of micro-capacitors, including: beam splitter configured to divide input optical signal into first optical path signal propagating along first optical path and second optical path signal propagating along second optical path; beam combiner configured to interference combine first optical path signal and second optical path signal before outputting modulated optical signal; first electro-optic phase shifter arranged in first optical path and configured to generate first phase shift for first optical path signal when applying driving electrical signal; second electro-optic phase shifter arranged in second optical path and configured to generate second phase shift for second optical path signal when applying driving electrical signal; micro-capacitors electrically connected to at least one electro-optic phase shifter in asymmetric manner. Configured to output modulated optical signal having fixed chirp amplitude without external regulation, to match optical fiber dispersion and improve transmission performance.

10 Claims, 3 Drawing Sheets

ELECTRO-OPTIC MODULATOR INTEGRATING MICRO-CAPACITOR

FIELD OF TECHNOLOGY

The present application relates to the technical field of optical communication, and more specifically, to an electro-optic modulator integrating a plurality of micro-capacitors.

BACKGROUND

In the related art, in an optical communication system, in particular in a short-range intensity modulation/direct detection (IM/DD) network for a plurality of scenes including a data center interconnect, a 5G fronthaul and more, a silicon-based Mach-Zehnder electro-optic modulator is widely used due to a high integration level and a compatibility to complementary metal-oxide-semiconductor process. However, such a group of modulators introduce inevitably a frequency chirp during a process of intensity modulation, that is, an instantaneous frequency of a light pulse varies over time. A traditional design generally pursues a symmetrical structure, so that two electro-optic phase shifters in both optical paths are completely consistent in size, doping, and driving conditions, so as to achieve a zero-chirp output, thereby avoiding pulse broadening caused by an interaction between chirp and optical fiber dispersion. However, in a practical application, with transmission distance increasing or a constraint of a system cost, it is found that a moderate positive chirp helps to compensate for a negative dispersion of a standard single-mode optical fiber, improving a transmission performance. Therefore, how to introduce a controllable chirp having a fixed amplitude becomes a new technical requirement.

In the prior art, a main method for implementing the controllable chirp comprises: adopting a asymmetric optical path design, or applying a differential driving voltage, or adjusting a bias point dynamically, and performing post-compensation by cascading additionally an phase modulator. However, the solutions stated above have a plurality of significant limitations including: a structure based on a length difference requires an extremely high process precision; differential driving or bias regulating requires a complex multi-electrode drive circuit and a real-time feedback mechanism, which increases a power consumption and control complexity of a system; while a protocol of additional cascade compensation results in a chip area increase and an insertion loss going up. More importantly, in the prior art, it is difficult to output stably and reliably an optical signal having a fixed chirp amplitude without external regulation. Therefore, there is an urgent need for a novel electro-optic modulator having a simple structure and a large process tolerance, while determining a chirp characteristic entirely by a physical characteristic of the device itself, so as to take into account both a dispersion management ability and a system integration efficiency.

Therefore, an electro-optic modulator integrating a plurality of micro-capacitors is needed urgently to improve the problems stated hereinabove.

SUMMARY

The present application provides an electro-optic modulator integrating a plurality of micro-capacitors and configured to output a modulated optical signal having a fixed chirp amplitude without external regulation, so as to match optical fiber dispersion and improve transmission performance.

According to a first aspect of an embodiment of the present application, an electro-optic modulator integrating a plurality of micro-capacitors is provided, comprising: a beam splitter configured to divide an input optical signal into a first optical path signal propagating along a first optical path and a second optical path signal propagating along a second optical path; a beam combiner configured to interference combine the first optical path signal and the second optical path signal before outputting a modulated optical signal; a first electro-optic phase shifter arranged in the first optical path and configured to generate a first phase shift for the first optical path signal when a driving electrical signal is applied; a second electro-optic phase shifter arranged in the second optical path and configured to generate a second phase shift for the second optical path signal when the driving electrical signal is applied; a plurality of micro-capacitors electrically connected to the first electro-optic phase shifter and/or the second electro-optic phase shifter in an asymmetric manner, so that when a same driving electrical signal is applied, the first electro-optic phase shifter generates a phase shift different to that generated by the second electro-optic phase shifter, thereby a modulated optical signal having a fixed chirp amplitude is output from a whole light output port of the beam combiner.

In an embodiment, when both the first electro-optic phase shifter and the second electro-optic phase shifter have the plurality of micro-capacitors connected, the plurality of micro-capacitors include a plurality of first capacitors and a plurality of second capacitors; the first electro-optic phase shifter is connected in series to the plurality of first capacitors; and the second electro-optic phase shifter is connected in series to the plurality of second capacitors.

In an embodiment, a capacitance value of the first capacitor is different from a capacitance value of the second capacitor.

In an embodiment, when the plurality of micro-capacitors are electrically connected to the first electro-optic phase shifter and the second electro-optic phase shifter in an asymmetric manner, an amount of the plurality of micro-capacitors connected to the first electro-optic phase shifter is M, an amount of the plurality of micro-capacitors connected to the second electro-optic phase shifter is N, where M and N are positive integers; when M is greater than 1, the M micro-capacitors connected to the first electro-optic phase shifter are connected in parallel with each other; when N is greater than 1, the N micro-capacitors connected to the second electro-optic phase shifter are connected in parallel with each other.

In an embodiment, the beam splitter and the beam combiner are any one of a directional coupler, a multi-mode interferometer, and a Y-coupler, respectively.

In an embodiment, the beam splitter includes a whole light input port, a first split beam port and a second split beam port; the whole light input port is configured to receive and allocate an input optical signal to the first optical path signal and the second optical path signal according to a predetermined light splitting ratio; the first split beam port is connected to the first optical path, and the second split beam port is connected to the second optical path; the beam combiner includes a first beam combining port, a second beam combining port, and a whole light output port; the first optical path is connected to the first beam combining port; the second optical path is connected to the second beam combining port; the whole light output port is configured to perform interference combining the first optical path signal and the second optical path signal in the beam combiner before outputting a modulated optical signal; the first electro-optic phase shifter includes a first light input port and a first light output port; the first light input port is connected to the first split beam port; the first light output port is connected to the first beam combining port; the second electro-optic phase shifter includes a second light input port and a second light output port; the second light input port is connected to the second split beam port; the second light output port is connected to the second beam combining port.

In an embodiment, both the first electro-optic phase shifter and the second electro-optic phase shifter include an optical waveguide, a signal electrode, and a ground electrode; the signal electrode and the ground electrode are arranged in both sides of the optical waveguide respectively.

In an embodiment, the optical waveguide includes a first lightly-doped region and a second lightly-doped region; the first lightly-doped region and the second lightly-doped region have a different conductivity type; the first lightly-doped region and the signal electrode have a first heavily-doped region arranged in between; a conductivity type of the first heavily-doped region is same as a conductivity type of the first lightly-doped region; a doping concentration of the first heavily-doped region is higher than a doping concentration of the first lightly-doped region; the second lightly-doped region and the signal electrode have a second heavily-doped region arranged in between; a conductivity type of the second heavily-doped region is same as a conductivity type of the second lightly-doped region; a doping concentration of the second heavily-doped region is higher than a doping concentration of the second lightly-doped region.

In an embodiment, each of the plurality of micro-capacitors includes a metal electrode layer, the signal electrode, and a dielectric; the metal electrode layer is connected to the first heavily-doped region; the metal electrode layer is located between the signal electrode and the first heavily-doped region; both ends of the dielectric are connected to the metal electrode layer and the signal electrode respectively.

In an embodiment, each of the plurality of micro-capacitors includes a PN junction layer; the PN junction layer comprises two heavily-doped regions and at least one lightly-doped region; two conductivity types of the two heavily-doped regions are different; and the at least one lightly-doped region is located between the two heavily-doped regions.

Compared to the prior art, the present application has following benefits: since the plurality of micro-capacitors are electrically connected to the first electro-optic phase shifter and/or the second electro-optic phase shifter in an asymmetric manner, an equivalent capacitance of the first electro-optic phase shifter and an equivalent capacitance of the second electro-optic phase shifter is different; when applying a same driving electrical signal, the first electro-optic phase shifter and the second electro-optic phase shifter participate in forming two different RC low-pass filter circuits respectively, resulting in a deviation in a transient voltage response actually borne by the two RC low-pass filter circuits; the deviation of the voltage response comprises an amplitude deviation and a phase deviation, such that the first optical path signal propagating through the first optical path and the second optical path signal propagating through the second optical path are not dynamically consistent in phase modulation; when the two optical signals having different phase modulation are superimposed in the beam combiner, an intensity modulation process thereof will be able to couple to a chirp with a determined frequency; since a configuration of each of the each of the plurality of micro-capacitors is pre-cured by a physical structure of a device, such a phase modulation asymmetry remains constant after completing manufacturing the device, without relying on an external bias adjustment or a real-time feedback. Therefore, a modulated optical signal output by the beam combiner has a stable and fixed chirp amplitude. Such a fixed chirp characteristic can match a dispersion characteristic of a standard single-mode optical fiber, being able to effectively compensate for transmission dispersion in an IM/DD system, significantly prolong a transmission distance without a relay, and avoid power consumption and cost caused by a complex chirp control circuit or digital signal processing.

Wherein: 11—beam splitter, 12—first electro-optic phase shifter, 13—second electro-optic phase shifter, 14—first capacitor, 15—beam combiner, 16—second capacitor, 111—whole light input port, 112—first split beam port, 113—second split beam port, 151—whole light output port, 152—first beam combining port, 153—second beam combining port, 2—optical waveguide, 21—signal electrode, 22—ground electrode, 23—first heavily-doped region, 24—first lightly-doped region, 25—second lightly-doped region, 26—second heavily-doped region, 27—bias electrode, 28—metal layer, 291—metal electrode layer, 292—PN junction layer, 293—dielectric.

DESCRIPTION OF THE EMBODIMENTS

Unless otherwise defined, technical or scientific terms used in this specification shall have the ordinary meaning as understood by one of ordinary skill in the art to which the present application belongs. The detailed description of the present disclosure will be described below with reference to the accompanying drawings. It should be noted that, in the specific description of the embodiments, in order to describe the brief description, all features of the actual implementation may not be described in detail in this specification. Those skilled in the art can make modifications and substitutions to the embodiments of the present application without departing from the spirit and scope of the present application, and the obtained embodiments are also within the protection scope of the present application.

Figure 1:
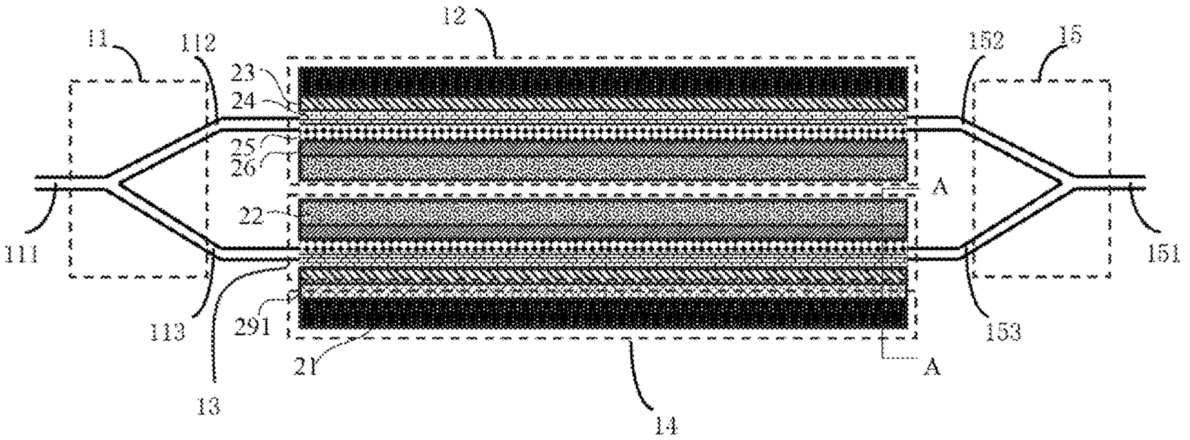
FIG. 1 illustrates a schematic structural diagram on an electro-optic modulator integrating a micro-capacitor having a metal electrode layer arranged according to an embodiment of the present application.

Shown as FIG. 1, a first embodiment of the present application provides an electro-optic modulator integrating a plurality of micro-capacitors, comprising: a beam splitter 11 configured to divide an input optical signal into a first optical path signal propagating along a first optical path and a second optical path signal propagating along a second optical path; a beam combiner 15 configured to interference combine the first optical path signal and the second optical path signal before outputting a modulated optical signal; a first electro-optic phase shifter 12 arranged in the first optical path and configured to generate a first phase shift for the first optical path signal when a driving electrical signal is applied; a second electro-optic phase shifter 13 arranged in the second optical path and configured to generate a second phase shift for the second optical path signal when the driving electrical signal is applied; a plurality of micro-capacitors electrically connected to the first electro-optic phase shifter 12 and/or the second electro-optic phase shifter 13 in an asymmetric manner, so that when a same driving electrical signal is applied, the first electro-optic phase shifter 12 generates a phase shift different to that generated by the second electro-optic phase shifter 13, thereby a modulated optical signal having a fixed chirp amplitude is output from a whole light output port 151 of the beam combiner 15.

In an embodiment, when both the first electro-optic phase shifter 12 and the second electro-optic phase shifter 13 have the plurality of micro-capacitors connected, the plurality of micro-capacitors include a plurality of first capacitors 14 and a plurality of second capacitors 16; the first electro-optic phase shifter 12 is connected in series to the plurality of first capacitors 14; and the second electro-optic phase shifter 13 is connected in series to the plurality of second capacitors 16.

In a plurality of specific embodiments, the first electro-optic phase shifter 12 is connected in series to the plurality of first capacitors 14 to form a first RC branch, and the second electro-optic phase shifter 13 is connected in series to the second capacitor 16 to form a second RC branch. By arranging two capacitance values of the first capacitor 14 and the second capacitor 16 not equal, when a same driving electrical signal is applied, two voltage transient responses of the two branches generate a difference, thereby causing the phase modulation of the two optical path signals to be dynamically asymmetric, and finally forming a modulated optical signal having a fixed chirp amplitude at a beam combining & output port. Such a structure not only achieves precise regulation of chirp characteristics, but also maintains a full-symmetric optical path layout in the device, which is beneficial to improving process tolerance and manufacturing yield.

In an implementation method, a capacitance value of a capacitance value of the first capacitor 14 is different from a capacitance value of the second capacitor 16.

In a plurality of embodiments, both the capacitance values of the first capacitor 14 and the second capacitor 16 are not zero.

In a plurality of embodiments, the capacitance value of the first capacitor 14 may be arranged to be between 1.2 times and 5 times the capacitance value of the second capacitor 16, so as to generate a positive chirp parameter for adapting standard single-mode fiber dispersion at a modulation rate of typically 10 Gbps to 50 Gbps. The first capacitor 14 and the second capacitor 16 may adopt a structure of metal-insulator-metal (MIM), and are integrated in a same dielectric layer by a back-channel CMOS interconnection process, while a capacitance value difference thereof can be achieved by adjusting the overlapping area of the upper/lower electrode plates or the thickness of the dielectric layer. The asymmetric capacitor configuration enables the two phase shifter branches to have different RC time constants, so that a controllable phase shift response deviation is generated when sharing a same drive signal, and finally a fixed chirp having a preset amplitude is generated stably in an output optical signal, without relying on an external bias adjustment or dynamic feedback control.

In an embodiment, when the plurality of micro-capacitors are electrically connected to the first electro-optic phase shifter 12 and the second electro-optic phase shifter 13 in an asymmetric manner, an amount of the plurality of micro-capacitors connected to the first electro-optic phase shifter 12 is M, an amount of the plurality of micro-capacitors connected to the second electro-optic phase shifter 13 is N, where M and N are positive integers; when Mis greater than 1, the M micro-capacitors connected to the first electro-optic phase shifter 12 are connected in parallel with each other; when N is greater than 1, the N micro-capacitors connected to the second electro-optic phase shifter 13 are connected in parallel with each other.

In a plurality of specific embodiments, when a certain phase shifter has a plurality of micro-capacitors arranged, the micro-capacitors are connected in parallel with each other and jointly forming an equivalent capacitance of the branch. In an embodiment, the first electro-optic phase shifter 12 has two, three, or more micro-capacitor units connected in parallel integrated, and a total capacitance value thereof is equal to a sum of the capacitance values of all units. By connecting the plurality of micro-capacitors in parallel, it can not only adjust an equivalent capacitance value of the branch flexibly to match a required chirp characteristic accurately, but also improve process robustness, even if a single micro-capacitor unit has a capacitance deviation due to manufacturing deviation, an average effect of connecting a plurality of capacitor units in parallel helps to reduce an overall fluctuation and improve device consistency. In addition, a parallel structure can further reduce an equivalent series resistance (ESR), improve a high-frequency response, and help to maintain a stable chirp performance under a high-speed modulation.

In an embodiment, the beam splitter 11 and the beam combiner 15 are any one of a directional coupler, a multi-mode interferometer, and a Y-coupler, respectively.

In a plurality of specific embodiments, when adopting a directional coupler, although a physical structure thereof comprises four waveguide ports, only three ports are used in the present application, while a fourth port is suspended or terminated to suppress a back reflection, thereby achieving an equivalent beam splitting function of 1×2 or a beam combining function of 2×1. A multi-mode interferometer and a Y-shaped coupler naturally have a three-port structure. The former achieves high-uniformity light splitting according to a self-image effect in the multi-mode waveguide, and the latter achieves low-loss power distribution by a tapered symmetrical branch, while both can be monolithically integrated with an electro-optic phase shifter and a plurality of integrated micro-capacitors on a same silicon optical platform, without affecting the fixed chirp characteristic formed by the asymmetric configuration of the plurality of micro-capacitors.

In an embodiment, the beam splitter 11 includes a whole light input port 111, a first split beam port 112 and a second split beam port 113; the whole light input port 111 is configured to receive and allocate an input optical signal to the first optical path signal and the second optical path signal according to a predetermined light splitting ratio; the first split beam port 112 is connected to the first optical path, and the second split beam port 113 is connected to the second optical path; the beam combiner 15 includes a first beam combining port 152, a second beam combining port 153, and a whole light output port 151; the first optical path is connected to the first beam combining port 152; the second optical path is connected to the second beam combining port 153; the whole light output port 151 is configured to perform interference combining the first optical path signal and the second optical path signal in the beam combiner 15 before outputting a modulated optical signal; the first electro-optic phase shifter 12 includes a first light input port and a first light output port; the first light input port is connected to the first split beam port 112; the first light output port is connected to the first beam combining port 152; the second electro-optic phase shifter 13 includes a second light input port and a second light output port; the second light input port is connected to the second split beam port 113; the second light output port is connected to the second beam combining port 153.

In a plurality of specific embodiments, the predetermined light splitting ratio is 50:50, the first split beam port 112 is connected to a light input port of the first electro-optic phase shifter 12 through the first optical path, and the second split beam port 113 is connected to a light input end of the second electro-optic phase shifter 13 through the second optical path. Accordingly, the beam combiner 15 is a three-port passive optical device, including a first beam combining port 152, a second beam combining port 153 and a whole light output port 151; the first beam combining port 152 receives the first optical path signal having been modulated by the first electro-optic phase shifter 12, the second beam combining port 153 receives the second optical path signal having been modulated by the second electro-optic phase shifter 13, both signals interfere inside the beam combiner 15, before being output from the whole light output port 151 as an intensity modulated optical signal. Further, the first electro-optic phase shifter 12 has a first light input port and a first light output port arranged, the first light input port thereof is optically coupled to the first split beam port 112, and the first light output port is optically coupled to the first beam combining port 152, so as to form a complete light transmission path. Similarly, the second electro-optic phase shifter 13 has a second light input port and a second light output port arranged, the second light input port thereof is connected to the second split beam port 113, and the second light output port is connected to the second beam combining port 153. A whole optical path forms a typical Mach-Zehnder interferometer structure, wherein an electrical asymmetry of the two arms (introduced by integrating the plurality of micro-capacitors) regulates a phase response difference, while the optical path itself maintains physical symmetry or controllable asymmetry, thereby ensuring that the modulator is able to output stably an optical signal having a fixed chirp amplitude under high-speed driving.

In an embodiment, both the first electro-optic phase shifter 12 and the second electro-optic phase shifter 13 include an optical waveguide 2, a signal electrode 21, and a ground electrode 22; the signal electrode 21 and the ground electrode 22 are arranged in both sides of the optical waveguide 2 respectively.

In a plurality of specific embodiments, the first electro-optic phase shifter 12 and the second electro-optic phase shifter 13 each comprises an embedded optical waveguide 2, together with a signal electrode 21 and a ground electrode 22 located respectively on both sides of the optical waveguide 2, before forming a transverse electric field driving structure. Specifically, the optical waveguide 2 is composed of an N-type lightly doped region and a P-type lightly doped region 25 connected to each other, with a cross section being strip-shaped or ridge-shaped, configured to guide an optical signal in a communication band. And on two lateral sides of the optical waveguide 2, it forms a P-type heavily-doped region and an N-type heavily-doped region by a doping process, serving as two electrical contact regions respectively, together with arranging a signal electrode 21 and a ground electrode 22 being metalized respectively above or on a side thereof. When the high-speed drive electrical signal is applied to the signal electrode 21, and the ground electrode 22 is grounded, it forms a transverse electric field in a cross-section of the optical waveguide 2, causing a carrier concentration to change, thereby modulating an effective refractive index of the optical waveguide 2 according to a plasma dispersion effect, and realizing the phase modulation to an optical signal in transmission. Such a horizontal electrode layout facilitates to not only reduce a driving voltage and improve the modulation efficiency, but also integrate with an upper metal interconnection process, so that an integrated micro-capacitor being connected subsequently can be directly built in a stack structure of metal-insulator-metal between the signal electrode 21 and the doped region, thereby realizing asymmetric regulation of an electrical path.

In a plurality of embodiments, the optical waveguide 2 includes a first lightly-doped region 24 and a second lightly-doped region 25; the first lightly-doped region 24 and the second lightly-doped region 25 have a different conductivity type; the first lightly-doped region 23 and the signal electrode 21 have a first heavily-doped region 23 arranged in between; a conductivity type of the first heavily-doped region 23 is same as the conductivity type of the first lightly-doped region 24; a doping concentration of the first heavily-doped region 23 is higher than a doping concentration of the first lightly-doped region 24; the second lightly-doped region 24 and the signal electrode 21 have a second heavily-doped region 26 arranged in between; a conductivity type of the second heavily-doped region 26 is same as the conductivity type of the second lightly-doped region 25; a doping concentration of the second heavily-doped region 26 is higher than a doping concentration of the second lightly-doped region 25.

In a plurality of embodiments, the optical waveguide 2 is composed of a semiconductor material, such as a top silicon layer, and forming a doping profile in a lateral region thereof to construct an electro-optic phase shifting function. Specifically, the optical waveguide 2 comprises a first lightly-doped region 24 and a second lightly-doped region 25, being arranged side by side along a light propagation direction or being symmetrically distributed on two sides of a center of the optical waveguide 2, and having an opposite conductivity type. In an embodiment, the first lightly-doped region 24 is P-type lightly-doped (p-) and the second lightly-doped region 25 is N-type lightly-doped (n-). A first heavily-doped region 23 is arranged between the first lightly-doped region 24 and the signal electrode 21, having a conductivity type as same as that of the first lightly-doped region 24 (that is, both are P-type), but a higher doping concentration, configured to reduce a contact resistance and achieve a good Ohmic connection.

Correspondingly, a second heavily-doped region 26 is arranged between the second lightly-doped region 25 and the ground electrode 22, having a conductivity type being consistent with that of the second lightly-doped region 25 (that is, both are N-type), and a doping concentration much higher than that of the second lightly-doped region 25. Therefore, an entire structure forms a laterally arranged PN junction: the lightly-doped region forms a body of a depletion layer, and a width thereof can be regulated with voltage under a reverse bias, thereby changing an effective refractive index of the optical waveguide 2; the heavily-doped regions on both sides serve as low-resistance electrical lead-out terminals, and connect respectively to the signal electrode 21 and the ground electrode 22, so as to ensure an efficient injection of a high-frequency drive signal. Such a doping design not only improves modulation efficiency and a bandwidth, but also provides an explicit electrical access point for integrating a plurality of subsequent micro-capacitors. In an embodiment, the integrated micro-capacitor may be connected in series between the signal electrode 21 and the first heavily-doped region 23, thereby regulating a RC response characteristic of the branch precisely.

Figure 2:
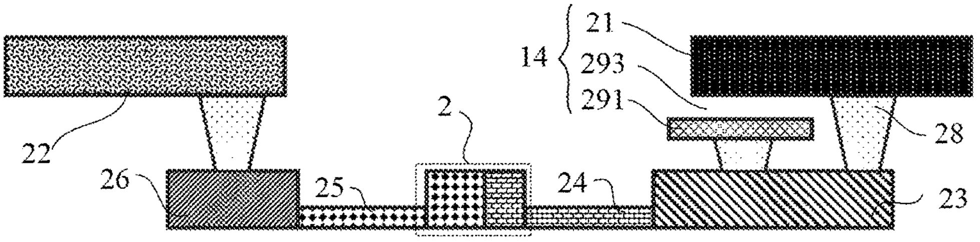
FIG. 2 illustrates a schematic cross-sectional view taken along line A-A in FIG. 1.
Figure 3:
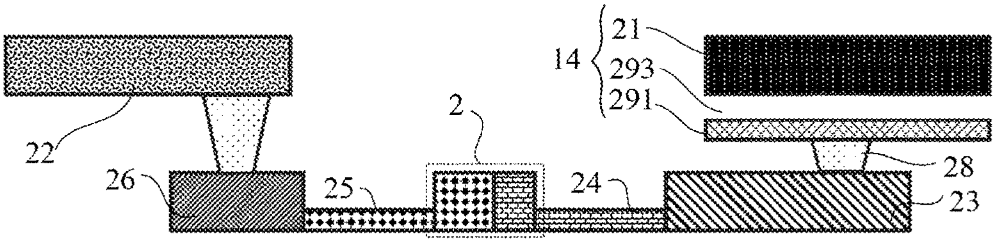
FIG. 3 illustrates a schematic structural diagram on a connection between a second electro-optic phase shifter and a micro-capacitor having a signal electrode and a metal electrode layer completely overlapped in a vertical direction according to an embodiment of the present application.

Shown as FIGS. 1-3, in an embodiment, each of the plurality of micro-capacitors includes a metal electrode layer 291, the signal electrode 21, and a dielectric 293; the metal electrode layer 291 is connected to the first heavily-doped region 23; the metal electrode layer 291 is located between the signal electrode 21 and the first heavily-doped region 23; both ends of the dielectric 293 are connected to the metal electrode layer 291 and the signal electrode 21 respectively.

Shown as FIG. 2, in a plurality of embodiments, the signal electrode 21 and the metal electrode layer 291 are partially overlapped in a vertical direction. Shown as FIG. 3, in a plurality of other embodiments, the signal electrode 21 and the metal electrode layer 291 are completely overlapped in the vertical direction. The vertical direction is perpendicular to an extension direction of the optical waveguide 2.

Taking a silicon-based photonic integrated platform as an embodiment, such as a silicon-on-insulator (SOI) micro-capacitor adopting a metal-insulator-metal (MIM) structure, wherein a dielectric layer is composed of silicon dioxide ($SiO_2$). The silicon dioxide layer can be formed by a plasma-enhanced chemical vapor deposition (PECVD) or a high-density plasma chemical vapor deposition (HDP-CVD) in a standard CMOS back-end-of-line (BEOL), having a good step coverage, compactness and dielectric uniformity, and being completely compatible with a metal interconnection process of a silicon optical device.

Shown as FIGS. 4-7, in an embodiment, each of the plurality of micro-capacitors includes a PN junction layer 292; the PN junction layer 292 comprises two heavily-doped regions and at least one lightly-doped region; two conductivity types of the two heavily-doped regions are different; and the at least one lightly-doped region is located between the two heavily-doped regions.

In a plurality of specific embodiments, the first heavily-doped region 23 is a P-type heavily-doped region, the first lightly-doped region 24 is a P-type lightly-doped region, the second heavily-doped region 26 is an N-type heavily-doped region, and the second lightly-doped region 25 is an N-type lightly-doped region. The N-type heavily-doped region is connected to the signal electrode 21 by a metal layer 28.

Figure 4:
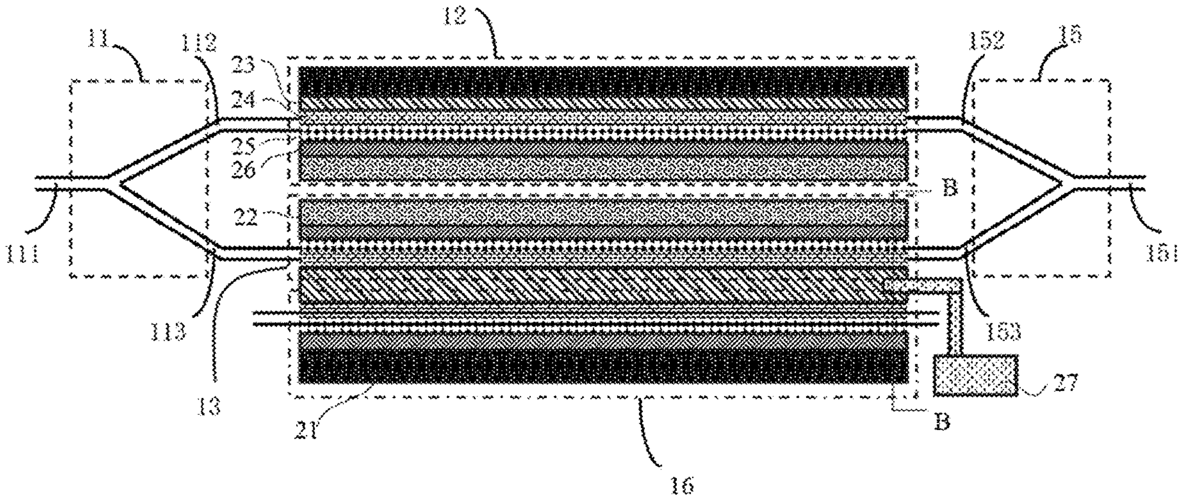
FIG. 4 illustrates a schematic structural diagram on an electro-optic modulator integrating a micro-capacitor having a first PN junction layer arranged according to an embodiment of the present application.
Figure 5:
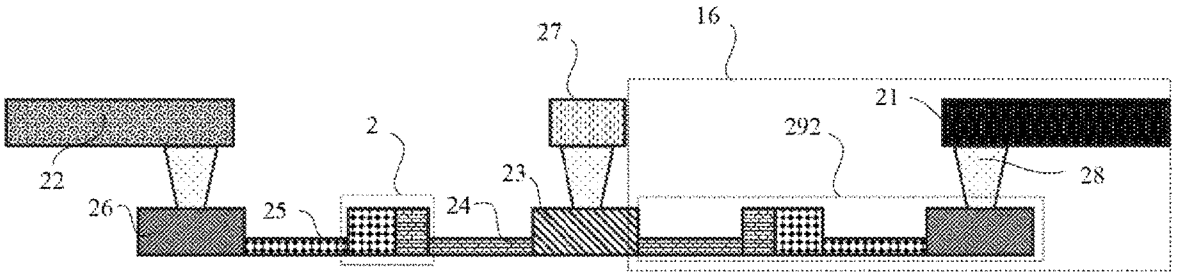
FIG. 5 illustrates a schematic cross-sectional view taken along line B-B in FIG. 4.

Shown as FIGS. 4 and 5, in a plurality of embodiments, the PN junction layer 292 comprises a P-type lightly-doped region, an N-type lightly-doped region, and an N-type heavily-doped region. The P-type lightly-doped region in the PN junction layer 292 is connected to the N-type heavily-doped region of the second electro-optic phase shifter 13.

In a plurality of embodiments, the first heavily-doped region 23 further has a bias electrode 27 connected, the bias electrode 27 is configured to provide a fixed reverse bias voltage for the PN junction layer 292. The reverse bias voltage acts on a PN junction formed by the first heavily-doped region 23 and an adjacent lightly-doped region (e.g. an N-type lightly-doped region), so as to form a depletion layer near an interface therebetween. Since a doping concentration of the heavily-doped region is much higher than that of the lightly-doped region, the depletion layer is mainly extending transversely to one side of the lightly-doped region, with a width direction perpendicular to the propagation direction of the optical signal, and located in the cross-section of the optical waveguide. By fixing the reverse bias voltage, it can make the width of the depletion layer keep constant, thereby obtaining a stable junction capacitance value; such a junction capacity acts as an integrated micro-capacitor to participate in constituting an RC low-pass filter circuit, ensuring that the voltage transient response difference of the two optical paths is stable, and finally achieving the chirp characteristic fixed of the output optical signal from the modulator.

Figure 6:
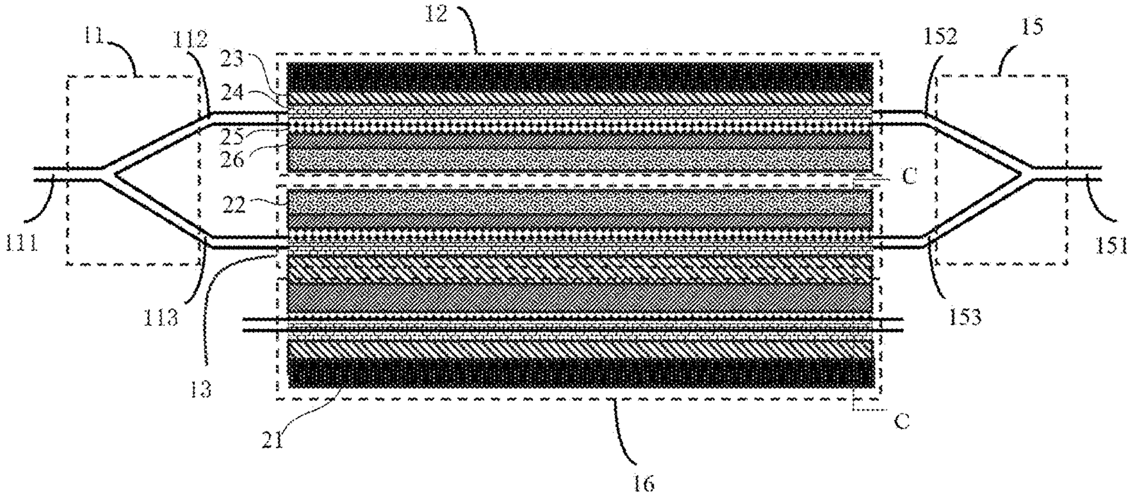
FIG. 6 illustrates a schematic structural diagram on an electro-optic modulator integrating a micro-capacitor having a second PN junction layer arranged according to another embodiment of the present application.
Figure 7:
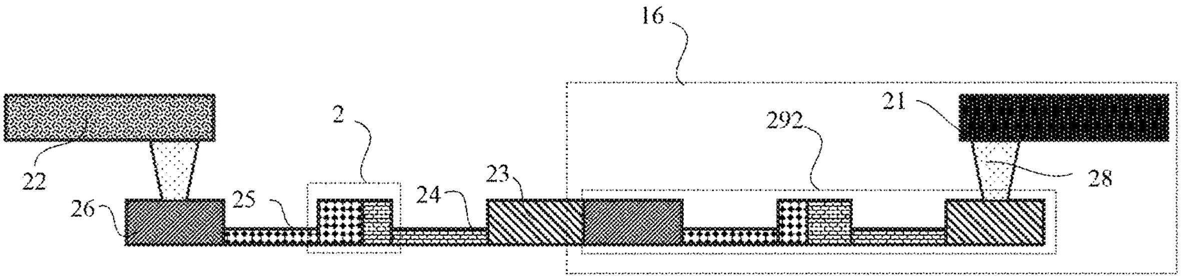
FIG. 7 illustrates a schematic cross-sectional view taken along line C-C in FIG. 6

Shown as FIGS. 6 and 7, in a plurality of other embodiments, the PN junction layer 292 includes an N-type heavily-doped region, an N-type lightly-doped region, a P-type lightly-doped region, and a P-type heavily-doped region. The N-type lightly-doped region in the PN junction layer 292 is connected to the P-type heavily-doped region of the second electro-optic phase shifter 13. The P-type heavily-doped region is connected to the signal electrode 21 by a metal layer 28.

In a plurality of other specific embodiments, the first heavily-doped region 23 is an N-type heavily-doped region, the first lightly-doped region 24 is an N-type lightly-doped region, the second heavily-doped region 26 is a P-type heavily-doped region, and the second lightly-doped region 25 is a P-type lightly-doped region.

In the present application, the terms "first" and "second" are used for descriptive purposes only and are not to be construed as indicating or implying relative importance. The term "a plurality of" means two or more, unless expressly defined otherwise.

The description of the embodiments stated above is intended to facilitate a person of ordinary skill in the art to understand and apply the present application. Those skilled in the art can easily make various modifications to these embodiments, and apply the general principles described herein to other embodiments without involving any inventive effort. Therefore, the present application is not limited to the embodiments herein, and improvements and modifications made by those skilled in the art according to the disclosure of the present application without departing from the scope and spirit of the present application are within the scope of the present application.

What is claimed is:

1. An electro-optic modulator integrating a micro-capacitor, comprising:

a beam splitter, configured to divide an input optical signal into a first optical path signal propagating along a first optical path and a second optical path signal propagating along a second optical path;

a beam combiner, configured to interferometrically combine the first optical path signal and the second optical path signal before outputting a modulated optical signal;

a first electro-optic phase shifter, arranged in the first optical path and configured to generate a first phase shift for the first optical path signal when a driving electrical signal is applied;

a second electro-optic phase shifter, arranged in the second optical path and configured to generate a second phase shift for the second optical path signal when the driving electrical signal is applied; and a plurality of micro-capacitors, electrically connected to the first electro-optic phase shifter and/or the second electro-optic phase shifter in an asymmetric manner, so that when a same driving electrical signal is applied, the first electro-optic phase shifter generates a phase shift different to a phase shift generated by the second electro-optic phase shifter, thereby a modulated optical signal having a fixed chirp amplitude is output from a whole light output port of the beam combiner.

2. The electro-optic modulator according to claim 1, further comprising a plurality of first capacitors and a plurality of second capacitors in the plurality of micro-capacitors connected therewith when both the first electro-optic phase shifter and the second electro-optic phase shifter have the plurality of micro-capacitors connected, wherein the first electro-optic phase shifter is connected in series to the plurality of first capacitors; and the second electro-optic phase shifter is connected in series to the plurality of second capacitors.

3. The electro-optic modulator according to claim 2, wherein the first capacitor has a capacitance value different from a capacitance value of the second capacitor.

4. The electro-optic modulator according to claim 1, wherein the first electro-optic phase shifter has M micro-capacitors connected therewith, the second electro-optic phase shifter has N micro-capacitors connected therewith when the plurality of micro-capacitors are electrically connected to the first electro-optic phase shifter and the second electro-optic phase shifter in an asymmetric manner, where M and N are positive integers;

the M micro-capacitors connected to the first electro-optic phase shifter are connected in parallel with each other, when M is greater than 1; and the N micro-capacitors connected to the second electro-optic phase shifter are connected in parallel with each other, when N is greater than 1.

5. The electro-optic modulator according to claim 1, wherein the beam splitter and the beam combiner are any one of a directional coupler, a multi-mode interferometer, and a Y-coupler, respectively.

6. The electro-optic modulator according to claim 1, further comprising a whole light input port, a first split beam port and a second split beam port in the beam splitter; wherein the whole light input port is configured to receive and allocate an input optical signal to the first optical path signal and the second optical path signal according to a predetermined light splitting ratio; the first split beam port is connected to the first optical path, and the second split beam port is connected to the second optical path; the beam combiner comprises a first beam combining port, a second beam combining port, and the whole light output port; the first optical path is connected to the first beam combining port; the second optical path is connected to the second beam combining port; the whole light output port is configured to perform interference combining the first optical path signal and the second optical path signal in the beam combiner before outputting the modulated optical signal;

the first electro-optic phase shifter comprises a first light input port and a first light output port; the first light input port is connected to the first split beam port; the first light output port is connected to the first beam combining port;

the second electro-optic phase shifter comprises a second light input port and a second light output port; the second light input port is connected to the second split beam port; the second light output port is connected to the second beam combining port.

7. The electro-optic modulator according to claim 1, further comprising an optical waveguide, a signal electrode, and a ground electrode in each of both the first electro-optic phase shifter and the second electro-optic phase shifter, wherein the signal electrode and the ground electrode are arranged in both sides of the optical waveguide respectively.

8. The electro-optic modulator according to claim 7, further comprising a first lightly-doped region and a second lightly-doped region in the optical waveguide, and the first lightly-doped region and the second lightly-doped region have a different conductivity type; wherein the first lightly-doped region and the signal electrode have a first heavily-doped region arranged in between; a conductivity type of the first heavily-doped region is same as a conductivity type of the first lightly-doped region; a doping concentration of the first heavily-doped region is higher than a doping concentration of the first lightly-doped region; and the second lightly-doped region and the signal electrode have a second heavily-doped region arranged in between; a conductivity type of the second heavily-doped region is same as a conductivity type of the second lightly-doped region; a doping concentration of the second heavily-doped region is higher than a doping concentration of the second lightly-doped region.

9. The electro-optic modulator according to claim 8, further comprising a metal electrode layer, the signal electrode, and a dielectric in each of the plurality of micro-capacitors, wherein the metal electrode layer is connected to the first heavily-doped region; the metal electrode layer is located between the signal electrode and the first heavily-doped region; both ends of the dielectric are connected to the metal electrode layer and the signal electrode respectively.

10. The electro-optic modulator according to claim 1, further comprising a PN junction layer in each of the plurality of micro-capacitors, wherein the PN junction layer comprises two heavily-doped regions and at least one lightly-doped region; two conductivity types of the two heavily-doped regions are different; and the at least one lightly-doped region is located between the two heavily-doped regions.

* * * * *